US008331623B2

(12) United States Patent
Wu et al.

(10) Patent No.: US 8,331,623 B2
(45) Date of Patent: Dec. 11, 2012

(54) METHOD FOR TRACKING AND PROCESSING IMAGE

(75) Inventors: Bing-Fei Wu, Hsinchu (TW); Chao-Jung Chen, Hsinchu (TW); Chih-Chung Kao, Pingtung County (TW); Meng-Liang Chung, Changhua County (TW); Chung-Cheng Chiu, Taoyuan County (TW); Min-Yu Ku, Taipei County (TW); Chih-Chun Liu, Yunlin County (TW); Cheng-Yen Yang, Changhua County (TW)

(73) Assignee: National Chiao Tung University, Hsinchu (TW)

( * ) Notice: Subject to any disclaimer, the term of this patent is extended or adjusted under 35 U.S.C. 154(b) by 1022 days.

(21) Appl. No.: 12/318,198

(22) Filed: Dec. 23, 2008

(65) Prior Publication Data

US 2010/0158312 A1 Jun. 24, 2010

(51) Int. Cl.
*G06K 9/00* (2006.01)

(52) U.S. Cl. ........................................ 382/104; 382/103

(58) Field of Classification Search .................. 382/103, 382/104, 190, 199; 340/934; 348/149
See application file for complete search history.

(56) References Cited

U.S. PATENT DOCUMENTS

2009/0316957 A1* 12/2009 Chen et al. ..................... 382/104

OTHER PUBLICATIONS

Kai-Tai Song and Jen-Chao Tai, Dynamic Calibration of Pan-Title-Zoom Cameras for Traffic Monitoring, 2006,IEEE Transactions on Systems, Man, and Cybernetics—Part B: Cybernetics, vol. 36, No. 5, Oct. 2006.*

* cited by examiner

*Primary Examiner* — Claire X Wang
(74) *Attorney, Agent, or Firm* — Bacon & Thomas, PLLC (57) ABSTRACT

The invention relates to a method for image processing, which can be used to calibrate the background quickly. When the external environment is changed due to the switch of light, the color of background is calibrated quickly, and the background can be updated together. The method not only is used to update the background, but also can be used to eliminate the convergence of background again.

3 Claims, 6 Drawing Sheets

Sobel

| 1 | 2 | 1 |
|---|---|---|
| 0 | 0 | 0 |
| -1 | -2 | -1 |

Horizontal direction

| 1 | 0 | -1 |
|---|---|---|
| 2 | 0 | -2 |
| 1 | 0 | -1 |

Vertical direction

Prewitt

| -1 | -1 | -1 |
|---|---|---|
| 0 | 0 | 0 |
| 1 | 1 | 1 |

Horizontal direction

| -1 | 0 | 1 |
|---|---|---|
| -1 | 0 | 1 |
| -1 | 0 | 1 |

Vertical direction

METHOD FOR TRACKING AND PROCESSING IMAGE

BACKGROUND OF THE INVENTION

1. Field of the Invention

The invention relates to a method for image processing, particularly to a processing method for image tracking.

2. Description of the Prior Art

In a monitoring environment, particularly in the indoor place, when light is switched on or switched off, the lamplight of monitoring environment will be changed suddenly and greatly. It may cause the wrong color information of background image in the monitoring system designed by referring the background information. It will be unable to cut out the correct object from the background. Thus, in order to adapt to lightness variation, it is necessary to calibrate the color of background image.

In the relevant U.S. Pat. No. 5,548,659, when the image is tracked, a lot of noise is mixed in the retrieved information of moving-object due to the lightness variation. Thus the patent adopts the noise model formula to deal with the problem of light source. As for the light processing method, the linear regression model is used to retrieve the sampling points in the picture. Correct the intensity of the original static light by comparing the light intensity of the moving-object and the light intensity of the original static image.

In the relevant Taiwan Patent No. 1220969, upon dealing with the lightness variation caused by weather, the system obtains the difference value by comparing the initial background with successive images. If the difference value is greater than the default threshold value of the system, the background will be updated. Otherwise, it will not be updated.

The above-mentioned inventions are more suitable for the condition that the lightness variation changes progressively, which are not proper that the lightness variation will changes suddenly, especially in the indoor environment, such as tunnel. If the background convergence method is adopted again, it will take longer time to obtain correct background information, and it is very inconvenient to use it practically. Thus, it is necessary to provide a new invention that can update the background information correctively and timely.

SUMMARY OF THE INVENTION

The invention relates to a method for tracking and processing image, which can be used to calibrate the background timely, and to increase the processing effect of background.

In the invention, the background image is obtained first, and then the information of static area in the monitoring range is obtained. Due to the information of static area is stable and there is no moving-object in the static area, the successive (real-time) image information can refer to the information of static area and calculate the difference value of image after the light is switched. The color statistic method can be utilized to quickly calibrate the initial background information directly.

According to the above-mentioned description, the invention further comprises the edge detecting method to retrieve a traffic lane line in the initial background information, and employ the traffic lane line to calibrate the initial background information and the real time monitoring image information. In addition, the judgment of traffic lane line can be used to adjust the tilt angle, pan angle and elevation of camera.

According to the above-mentioned description, the difference value between the initial image background information and the real time monitoring image information is employed to calculate the information of a moving-object, and the edge feature is employed to track to the information of the moving-object.

When the external environment is changed due to the switch of light, the color of background can be calibrated quickly by the invention, and the background can be updated together.

The method not only can be used to update the background, but also can be used to eliminate the convergence of background again, in order to speed the processing time.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein.

DESCRIPTION OF THE PREFERRED EMBODIMENT

Figure 1:
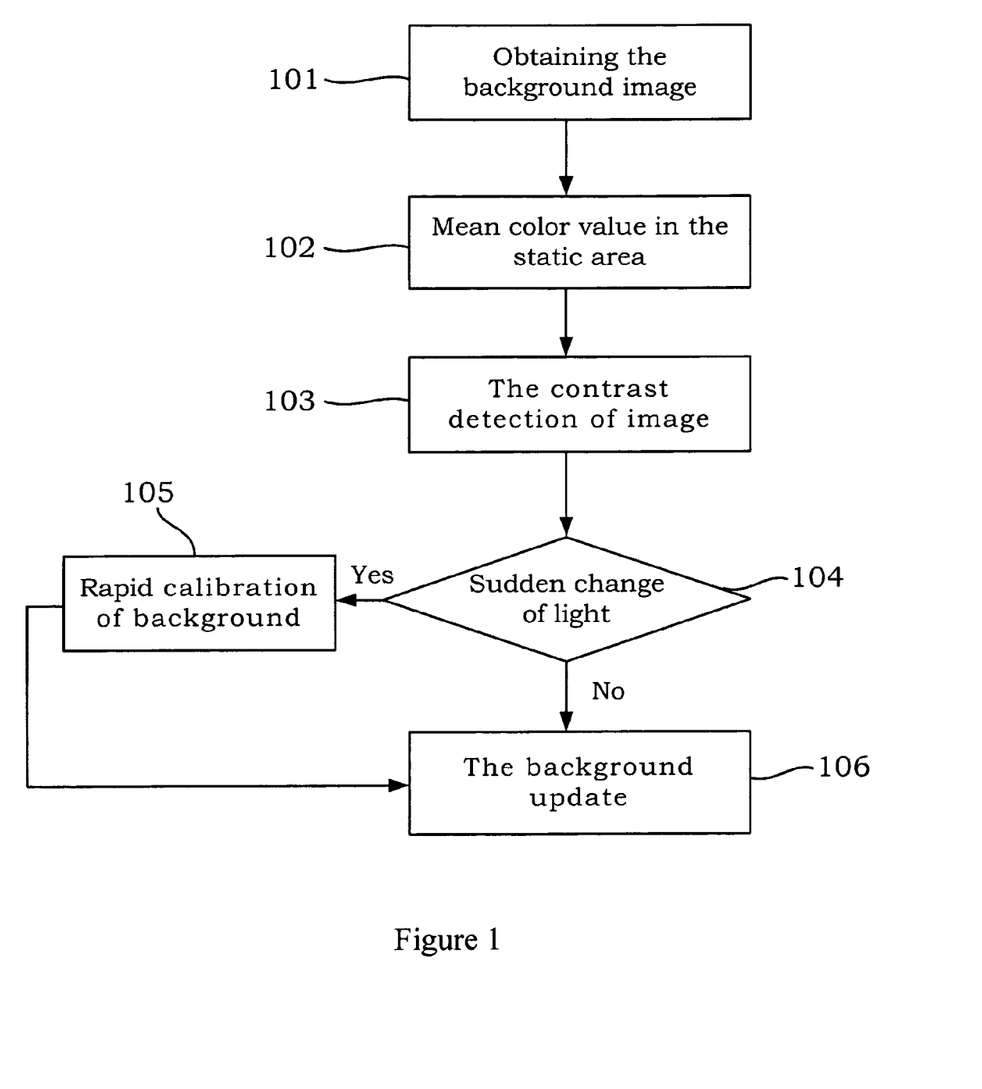
FIG. 1 shows the flow chart of the method for a preferred embodiment of the invention.

The invention proposes a method of image processing. Referring to FIG. 1, it is the flow chart of the method, which shows a preferred embodiment of the invention.

In FIG. 1 of the invention, the background image 101 is obtained first, and then the information of static area in the monitoring range 102, i.e. mean color value in the static area is obtained. Due to the information of static area (mean color value) 102 is stable and there is no moving-object in the static area, thus the real time image information can be referred to conduct the contrast detection of image 103. When the sudden change of light 104 is coming, rapid calibration of background 105 will be carried out. Finally the background is updated 106 directly.

About calibrating the initial background information 105, that is, mainly using the light change of the static area information of real time image to calibrate the initial background information. Under the same environment condition (light source), the static area of the initial image background information is in accordance with that of the real time image. This calibration method can greatly reduce the background error caused by the lightness variation. Then the background update method 106 is employed to obtain the new background image quickly.

On the other word, the method for processing image according to the above-mentioned will comprise the followings:

Firstly, setting the information of a static area in a monitoring range is carried out. Then the initial background information of a monitoring image is setting. Next, the real time monitoring image information is retrieved. Sequentially, calculating an image intensity change for the real time monitoring image information and the static area information will be carried out. Finally, the initial background information according the image intensity change is adjusted.

Figure 2:
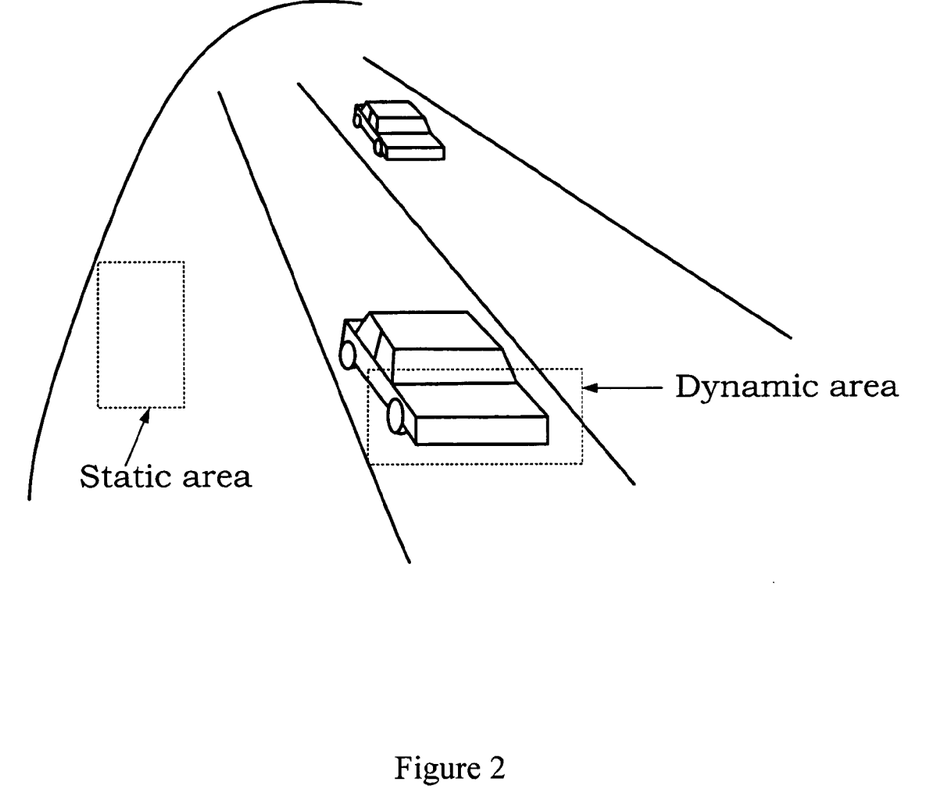
FIG. 2 shows the static area and dynamic area.

The picture is divided into two areas, one area is the dynamic area (expressed as $R_D$) for vehicle passing or other moving-object passing, the color of the dynamic area will be changed accompanying with moving-object passing. The other area is the static area (expressed as $R_S$) without any moving-object, as shown in FIG. 2. The color change of static area is mainly caused by the switch of the light. When the light is switched on/off suddenly, only adopting the background update rule to correct the background will cause large difference of background before and after the light change. In the prior art method by calculating the difference of background and real time image under great lightness variation, the system will be regard the background information as the foreground information and the following shortcomings will be generated:

1. Serious error of the foreground information; and
2. The update of background will not be calculated in the real time image. Thus, the background information will be kept at wrong state all the time, and the detecting system will enter an irreversible invalid state.

The rapid background calibration 105 of the invention analyzes the light change in $R_S$ area mainly, calculating the difference value to simulate the change of light source, and corrects the color in $R_D$ area. The calibration method employs the change of illumination intensity as the feedback amount to quickly calibrate the background image directly, in order to reduce its error quickly. Thus only a small amount of error will be left between the calibrated background image and actual background image. The rapid background renew rule not only expands the background update description, but also improves the concern of insufficient update speed.

According to the image formation model, the image sensed by the vision will be changed in accordance with the intensity of external light source, and will have different expression due to different reflectance of object surface. Their relationship can be described by the first formula:

$$f(u, v) = i(u, v)r(u, v) \qquad \text{formula 1}$$

f: Image intensity function
i: Illumination intensity
r: Reflectance
u, v: Image coordinate In the u and v coordinate axis of the real time monitoring image information, it is known when the illumination i is stronger or the reflectance r of object surface is higher, the image intensity of the vision will be higher. This feature of vision can be used to simulate the problem of simultaneous light sudden switch, and the mathematical feature of equation can be used to reduce the background error caused by the light change. Every object on the picture, no matter it has moving characteristics or not, will have a reflectance r corresponding to light, and this coefficient is only influenced by the object surface, which is not changed by the light factor. The illumination intensity will be changed according to the light factor. Thus the image intensity will be changed according to the change of real-world environment. Wherein, r lies between 0 (total absorption) and 1 (total reflection), basically the illumination intensity locates between 0 to ∞, and f (u, v) is normalized to [0, 255]. For example, in the gray scale, f (u, v)=0 is corresponding to black, f(u, v)=255 is corresponding to white, and other value between 0 and 255 is corresponding to gray tone changed from black to white. Upon utilizing the principle, the invention further extends the application of gray scale to the partial weight of every color in RGB color model.

The illumination is almost the same at every place in the picture. The illumination intensity of the picture all will be changed from i to i' due to the switch of light, the mean value of color $f_S$ is calculated in the $R_S$ area. When light is switched, the mean value is changed from $f_S$ to $f_S'$. Similarly, the illumination intensity is changed from i to i'. Thus, in the $R_D$ area, the illumination intensity is changed from i to i', so that the mean value is changed from $f_D$ to $f_D'$.

The rapid background renew method employs the stable color change in $R_S$ area to calibrate the background color in $R_D$ area, which calibrates $f_D$ into $f_D'$. The $f_D$ calibration method can be obtained by the following second formula, where f can be displaced from gray scale intensity to R, G and B partial amount of RGB color model:

$$f(u, v) = i(u, v)r(u, v) \qquad \text{formula 2}$$

$$\Rightarrow \begin{cases} f_s = i \times r_s \\ f_s' = i' \times r_s \\ f_D = i \times r_D \\ f_D' = i' \times r_D \end{cases}$$

$$\Rightarrow \begin{cases} \dfrac{f_s}{f_s'} = \dfrac{i}{i'} \\ \dfrac{f_D}{f_D'} = \dfrac{i}{i'} \end{cases}$$

$$\Rightarrow f_D' = f_D \times \dfrac{f_s'}{f_s}$$

It is known from second formula, when the illumination intensity is changed from i to i', the color is changed from $f_S$ to $f_S'$ in the $R_S$ area. The background image in $R_D$ monitoring area can be corrected from $f_D$ to $$f_D' = f_D \times \dfrac{f_s'}{f_s}$$

through this change amount. It should be noticed that $f_D'$ is a ratio with respect to $f_D$ calculated from the statistical result in the $R_S$ area. Thus, every image point in the $R_D$ area is adjusted by the ratio.

At the retrieving stage of color image background information in the invention, the first input image will be considered as the first category of color for every pixel. Then the Sum of Absolute Difference (SAD) is used to calculate the difference between the pixel of each color and the pixel of input image. If the difference is large, a new category is created for this color. On the contrary, the pixel is set as a "given" category, and the color information is updated. It is repeated the maximum probability for the appearance of each pixel is converged.

Figure 3:
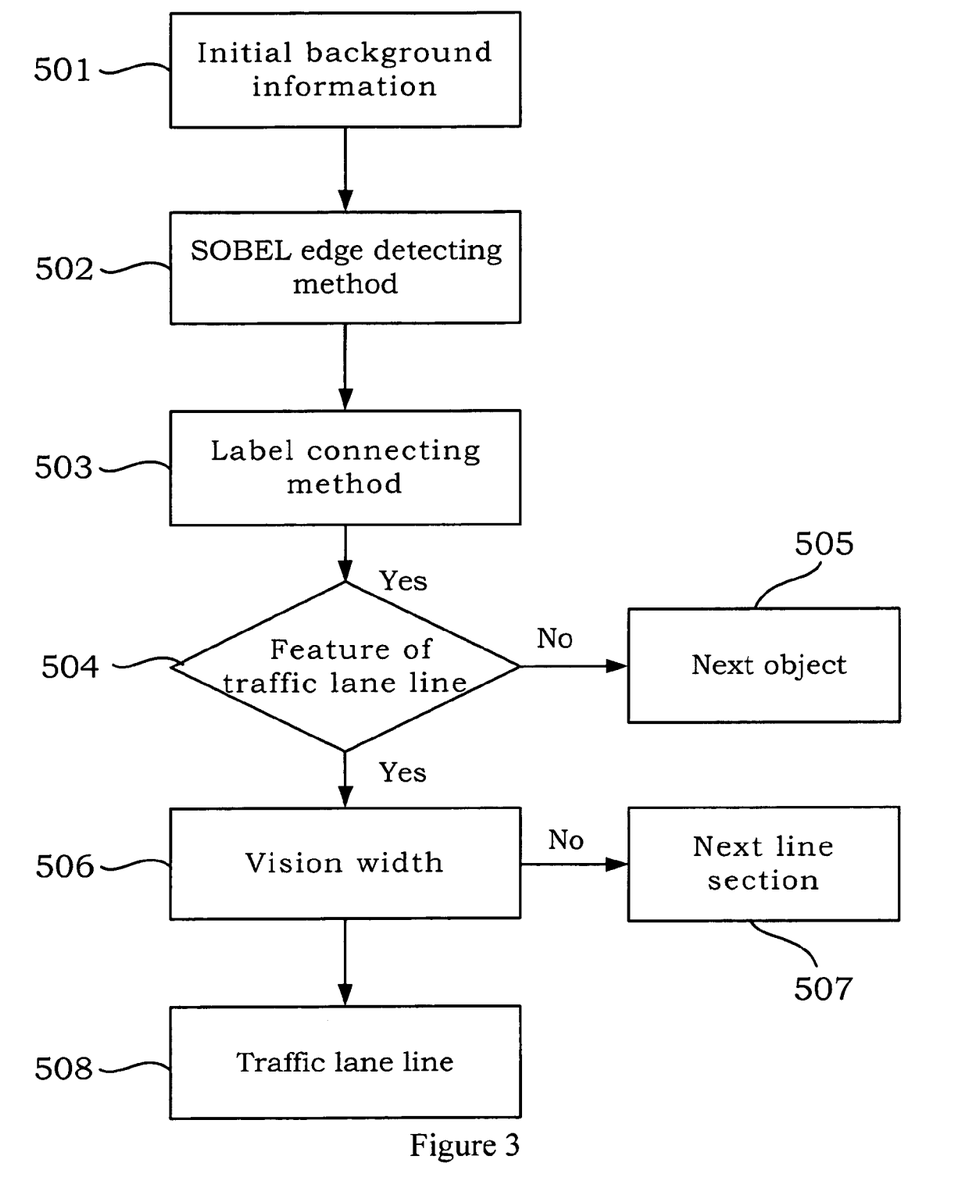
FIG. 3 shows the flow chart for the detection of traffic lane line.

FIG. 3 shows the flow chart for the detection of traffic lane line. The invention employs the computer vision method to judge whether the line section is the traffic lane line or not, including to deal with the initial background information 501, carrying out the edge detecting method 502, the label connecting method 503, to determine the feature of traffic lane line 504 (if it is "No", go to next object 505), to determine the vision width 506 (if it is "No", go to next line section 507), and to obtain the traffic lane line finally 508. It is expected to detect the traffic lane line upon obtaining the background information, in order to help the overlap detecting and cutting of the followed vehicle.

Figure 4:
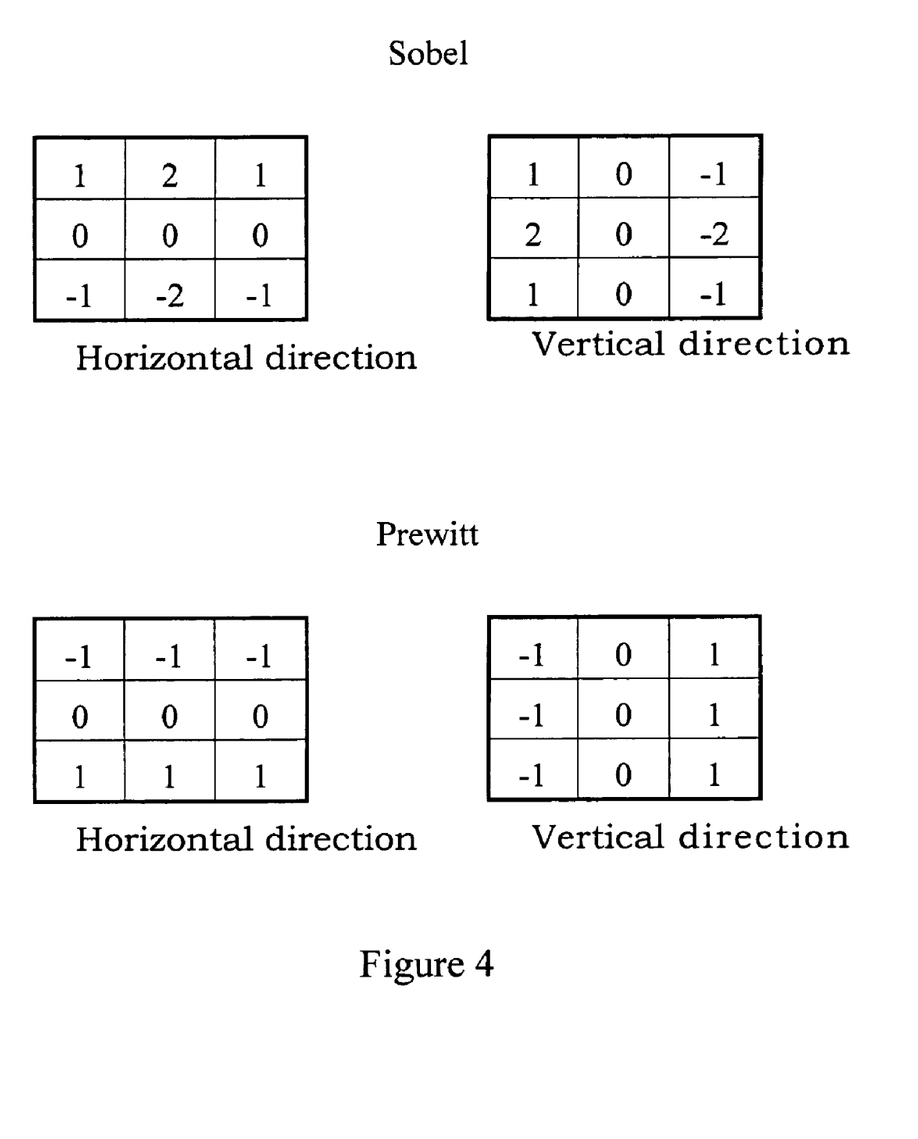
FIG. 4 shows the Sobel, Prewitt operator.

As the shield type shown in FIG. 4, the edge detecting mainly uses the detecting shield at the horizontal direction and vertical direction, which can be the Sobel operator or Prewitt operator, and set up the judgment threshold value to filter the most noise. When the operation value of Sobel is greater than threshold value, it is determined as the edge of image. The adjacent connection feature is used to mark these edge image points for classifying. The connection feature may be the detecting way of well-known eight-connection detecting way, four-connection detecting way and mix-connection detecting way. When the vertical height of these connection objects in the image coordinate is greater than certain height of image, calculate the slope and intercept of each object. When the vertical height of all line sections in the image are greater than certain height of image, collect all qualified slopes and intercepts to conduct the regression, in order to obtain the approximate slope and intercept.

After the regression of line sections is completed, using the image feature of the traffic lane line itself, which means certain distance should be kept among line sections, and then utilize the vision width to calculate whether there is a certain distance maintained between two line sections or not. Upon the vision width is calculated, not only calculate two sections by one time, all line sections should be divided from up to down as the equal section. Then using the equal section is carried out to calculate the vision width, upon all of the sections are calculated under the equal division. If the vision widths are close and reach to certain weight for adjacent line sections, they are judged as the traffic lane line, thus the traffic lane line is used to divide the lane. The traffic lane line can be used to cut the moving-object information, particularly there is overlap phenomenon caused by the interception, parallel moving of two vehicles or shadow. If two original un-connection vehicles are combined as a large scale vehicle by the above-mentioned effect, it will be un-classification or wrong classification by using the vision length and width as the classification condition of the moving vehicles. Normally, all vehicles are driven in the traffic lane on the road, if there is any moving-object suddenly appeared on the road and cross over the traffic lane line, the overlap phenomenon may be caused by the above-mentioned interception, parallel moving of two vehicles or shadow. Thus the flow chart shown in FIG. 5 is employed by the invention to cut the moving-object information.

Figure 5:
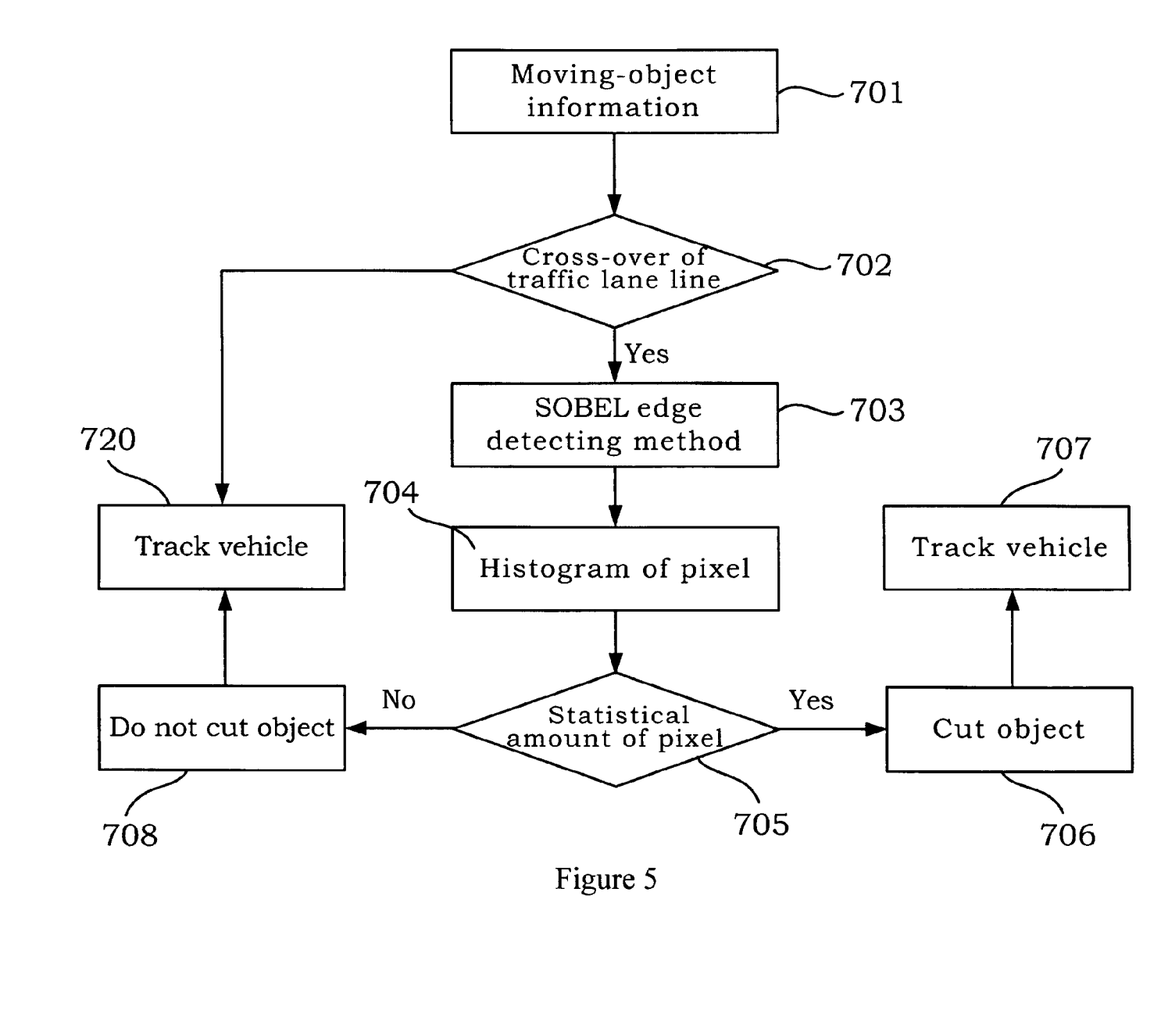
FIG. 5 shows the flow chart to cut the moving-object information.

As the flow diagram shown in FIG. 5, firstly deal with the moving-object information 701, judge the cross-over of traffic lane line 702, carry out the Sobel edge detecting method 703, deal with the histogram of pixel 704, judge the statistical amount of pixel 705, cut object 706, track vehicle 707, not cut object 708, and track vehicle 720. The edge characteristic points are statistically calculated individually when two objects being divided by the traffic lane line. By the intensity of edge characteristic points, distinguish whether the object is shadow or vehicle. When the edge image is a vehicle, there must be many edge points. If it is not a vehicle, it will be shadow with less edge points, because the road surface with the existence of shadow is pretty smooth basically. It will be helpful for resolving the problem of shadow overlap and vehicle overlap. When the moving vehicle changes the traffic lane, it will cross over the traffic lane line too. However, new cut-object does not meet the definition of vehicle, thus the cutting action will not be carried out. As shown in FIG. 4, the shield used to detect the edge characteristic points is the same as the shield used to detect the traffic lane line. The threshold value must be smaller than the value set at the detecting procedure of traffic lane line.

When the difference of the initial image background information and the second instant image information is taken, its absolute value will be the Moving-object Sum of Absolute Difference (MSAD) and image. If the MSAD of certain pixel is bigger than a dynamic critical value $M_{TH}$, the pixel will be categorized as a moving-object. On the contrary, the pixel will be categorized as a background. The obtained moving-object shield can be shown by third formula. After the background picture is obtained, suitable threshold value is selected to find the moving-object in the image. Because light will cause the error by cutting moving-object, suitable threshold value has to be selected to solve the problem. This threshold value keeps a weight relationship with respect to the mean image intensity of whole picture and the image intensity of road surface. When the illumination intensity of image in the picture is lower, the difference between the object and background will be smaller compared to higher illumination of image. Thus, the threshold value has to be adjusted dynamically in accordance with the environmental characteristics of image.

$$\text{Moving-object shield} = \begin{cases} 1 & MSAD > M_{TH} \\ 0 & \text{Others} \end{cases} \quad \text{formula 3}$$

Upon retrieving the moving-object information, it is lower relationship with respect to the existence of shadow. However, upon tracking the object, shadow will often cause the situation of overlap, so that the object will be tracked incorrectly. Thus, except using the traffic lane line to cut the object, and using the edge characteristic to distinguish the object, the vehicle after cutting will comprise the residual shadow, particularly when the shadow leaves on the same moving direction of moving-object. Thus, the statistical characteristics of the illumination intensity, Sobel, and color can be used to remove shadow in the part effectively.

The color object can be suitably described by color tone, degree of saturation and illumination. The color tone is a color attribution to describe the pure color. The degree of saturation is a measure for addition of white light in pure color. The illumination is a parameter to describe the intensity of color, which is a key factor to describe the feeling of color. The shadow part belongs to the gray color, which is described by color tone, and its tone value is very low. Thus this can describe the gray characteristics of shadow, and can set possible shadow area.

After the possible gray color is selected according to the tone H, the characteristics of the gray intensity shall be considered. The generation of shadow is due to the direct sunlight is shielded, and then a color block with lower gray intensity will be generated on the road surface. Thus the color intensity information I is added to separate the road surface and shadow.

Due to the shadow is always fallen on the road surface, and the color intensity is relatively even, it does not have the high-frequency characteristics. Thus, if the Sobel is used to scan the possible shadow block with lower Sobel characteristics, the position of shadow block can be determined more accurately, where the Sobel operator can be used to determine the Sobel. The shield may be used by Sobel, Prewitt or other well-known operators shown in FIG. 4.

$$H = \begin{cases} \theta, & \text{if } B \leq G \\ 360 - \theta, & \text{if } B > G \end{cases}$$

$$\text{where } \theta = \cos^{-1}\left\{\frac{\frac{1}{2}[(R-G)+(R-B)]}{[(R-G)^2+(R-B)(G-B)]^{\frac{1}{2}}}\right\}$$

$$S = 1 - \frac{3}{R+G+B}[\min(R, G, B)]$$

$$I = \frac{1}{3}(R+G+B)$$

In addition, as for the procedure of object tracking, the basic principles of calculation method comprise the following basic principles:

1. The object has complete track route (enter from the edge of picture, leave from default direction);
2. The object will not be appeared suddenly;
3. The object will not be disappeared suddenly; and
4. The object will not be moved instantly.

Figure 6:
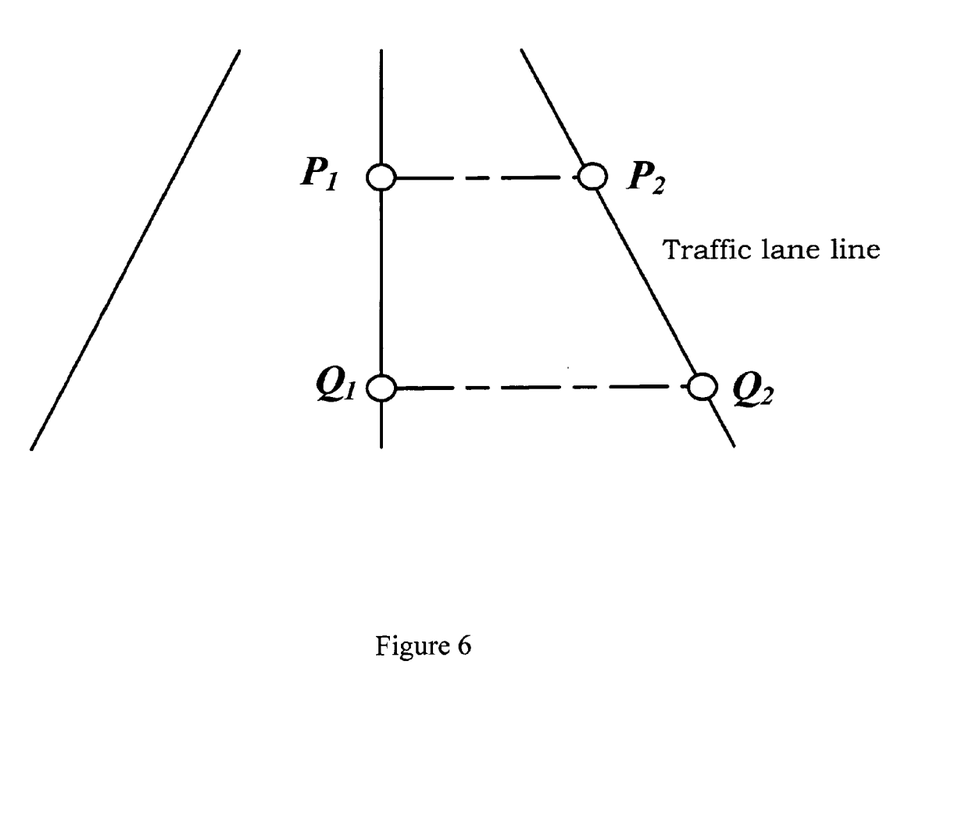
FIG. 6 shows the marking position of detected traffic lane line and two fictitious horizontal lines in the picture to calibrate the tilt angle.

The invention also can calibrate the image from the tilt angle, pan angle, and elevation of camera. The invention has already disclosed the method for detecting the traffic lane line:

1. Utilize the marking position of detected traffic lane line and two fictitious horizontal lines in the picture to calibrate the tilt angle. As shown in FIG. 6, the traffic line section $P_1P_2$ and line section $Q_1Q_2$ represent the lines with different length in the image, but in the coordinate of true world, they represent the traffic lane width W which is equal. In the calculation, W is assumed to be a certain value, and it is not necessary to know its definite value. The tilt angle of erected camera can be calibrated first through such relationship.

2. The value of pan angle can be obtained through the conversion of 3D coordinate (x, y, z) of true world and 2D coordinate (u, υ) of image. Finally, after the tilt angle and pan angle are calibrated, the known length in the image, such as the traffic lane width, marking line width etc. can be used to calculate the elevation camera.

What is claimed is:

1. A method for processing image comprises:
   setting an information of a static area in a monitoring range;
   setting an initial background information of a monitoring image, wherein the initial image background information comprises a color image background information;
   retrieving a real time monitoring image information;
   calculating an image intensity change for the real time monitoring image information and the static area information, wherein the image intensity change comprises:
   setting a reflectance and an illumination for the real time monitoring image information;
   employing a difference value between the initial image background information and the real time monitoring image information to calculate a moving-object information by using an edge feature to track the moving-object information, wherein the difference value comprising dynamically adjusting by using a statistical information and the edge feature is a horizontal direction and a vertical direction of a projected statistical area;
   calculating the moving-object information and a simultaneous change rate for a color space of the initial image background information to judge a shadow part in the moving-object information by using an edge feature to track the second moving-object information, wherein the edge feature is a horizontal direction and a vertical direction of a projected statistical area;
   employing the moving-object information to subtract the shadow part to obtain a second moving-object information; and
   adjusting the initial background information according the image intensity change.

2. A method for processing image by using the light change of the static area and dynamic area, comprising:
   obtaining a background image;
   obtaining an information of a static area in a monitoring range, wherein the information of the static area being stable and there is no moving-object in the static area to be a mean color value;
   conducting a contrast detection of image by referring to a real time image information;
   identifying a light change;
   carrying out a calibration of background by using the light change of the static area of the real time image information to calibrate an initial background information, and by using an edge detecting method to retrieve a traffic lane line in the initial background information, and employing a traffic lane line to calibrate the initial background information and the real time image information, wherein analyzing the light change in the static area, calculating a difference value to simulate a change of light source, and correcting a color in a dynamic area; and
   employing a background update method to obtain a new background image.

3. The method according to the claim 2, wherein the edge detecting comprises the detecting shield at a horizontal direction and a vertical direction.

* * * * *